United States Patent [19]
Kokubun

[11] Patent Number: 5,181,736
[45] Date of Patent: Jan. 26, 1993

[54] STRUCTURE FOR MOUNTING SUSPENSION UNIT ON VEHICLE BODY

[75] Inventor: Hitoshi Kokubun, Kanagawa Pref., Japan

[73] Assignee: Nissan Motor Co., Ltd., Yokohama City, Japan

[21] Appl. No.: 740,559

[22] Filed: Aug. 5, 1991

[30] Foreign Application Priority Data

Aug. 8, 1990 [JP] Japan .................... 2-210730

[51] Int. Cl.⁵ .......................................... B60G 11/42
[52] U.S. Cl. .................... 280/719; 280/796; 267/52; 267/141.2; 267/293
[58] Field of Search ........... 280/673, 719, 720, 699, 280/788, 796; 267/52, 141.2, 293

[56] References Cited

U.S. PATENT DOCUMENTS

| | | | |
|---|---|---|---|
| Re. 18,457 | 5/1932 | Lord | 267/141.2 |
| 2,697,613 | 12/1954 | Giacosa | 267/52 |
| 4,887,841 | 12/1989 | Cowburn et al. | 280/719 |

FOREIGN PATENT DOCUMENTS 2-283518 11/1990 Japan .
0309028 12/1990 Japan ........................ 267/141.2

Primary Examiner—David M. Mitchell
Assistant Examiner—Tamara L. Graysay
Attorney, Agent, or Firm—Pennie & Edmonds

[57] ABSTRACT

A structure of a vehicle includes a cross member which constitutes a part of a vehicle body. A rear suspension unit mounted on the cross member has two front and two rear suspension-supporting insulators and a transverse leaf spring. A spring support member for supporting the transverse leaf spring is secured to the vehicle body and positioned below the cross member. Two rear suspension-supporting bolts have upper end portions secured to the cross member, lower end portions secured to the spring support member, and middle portions secured to the rear suspension-supporting insulators of the rear suspension unit.

9 Claims, 3 Drawing Sheets

STRUCTURE FOR MOUNTING SUSPENSION UNIT ON VEHICLE BODY

BACKGROUND OF THE INVENTION

1. Field of the Invention

The present invention relates in general to structures for mounting a suspension unit on a vehicle body, and more particularly to structures for reinforcing suspension supporting bolts through which the suspension unit is mounted on the vehicle body.

2. Description of the Prior Art

Japanese Patent First Provisional Publication 2-283518 shows a rear suspension unit of a so-called multi-link type. The rear suspension unit of this publication has at least one lateral rod in addition to upper and lower arms, each of the arms is swingably connected to an axle housing and a suspension member. The rear suspension unit is equipped with a transverse leaf spring which is connected at its both ends to the axle housings. A spring support member for supporting the leaf spring is secured at its both ends to a vehicle body. The suspension member is mounted at its two front suspension-mounting insulators and its rear suspension-mounting insulator on the vehicle body through three suspension-supporting bolts which pass therethrough. Because of provision of the transverse leaf spring instead of conventional coil springs, it is made possible to widen a rear flat floor of a motor vehicle. Therefore, the rear suspension unit of this type can be widely applied to various types of motor vehicles, such as van and wagon.

SUMMARY OF THE INVENTION

It is a general object of the present invention to provide a structure for mounting a suspension unit on a vehicle body, which can exhibit more satisfactory rigidity in comparison with the conventional one.

It is a more specific object of the present invention to provide a structure for reinforcing rear suspension-supporting bolts, which can exhibit satisfactory rigidity.

It is a further object of the present invention to provide a suspension unit which is light in weight and capable of substantially suppressing vibration.

According to a first aspect of the present invention, there is provided a structure of a vehicle, comprising: a cross member which constitutes a part of a vehicle body; a suspension unit which has a supported portion and a transverse leaf spring, a spring support member secured to the vehicle body, the spring support member being positioned below the cross member; and a suspension supporting bolt which has an upper end portion secured to the cross member, a lower end portion secured to the spring support member, and a middle portion secured to the supported portion of the suspension unit.

According to a second aspect of the present invention, there is provided a vehicle suspension unit mounted on a vehicle body through a suspension supporting bolt, the vehicle suspension unit comprising: a suspension member which has a supported portion; an upper arm in the form of an A-shaped frame, the upper arm being swingably connected at inner end portions thereof to the suspension member; a lower arm in the form of an A-shaped frame, the lower arm being swingably connected at inner end portions thereof to the suspension member; and a transverse leaf spring connected to the suspension member through a connecting link, the transverse leaf spring being supported by a spring support member which is secured to and positioned below the vehicle body, wherein the suspension supporting bolt has an upper end portion secured to the vehicle body, a lower end portion secured to the spring support member, and a middle portion secured to the supported portion of the suspension member.

DESCRIPTION OF THE PREFERRED EMBODIMENT

Figure 1:
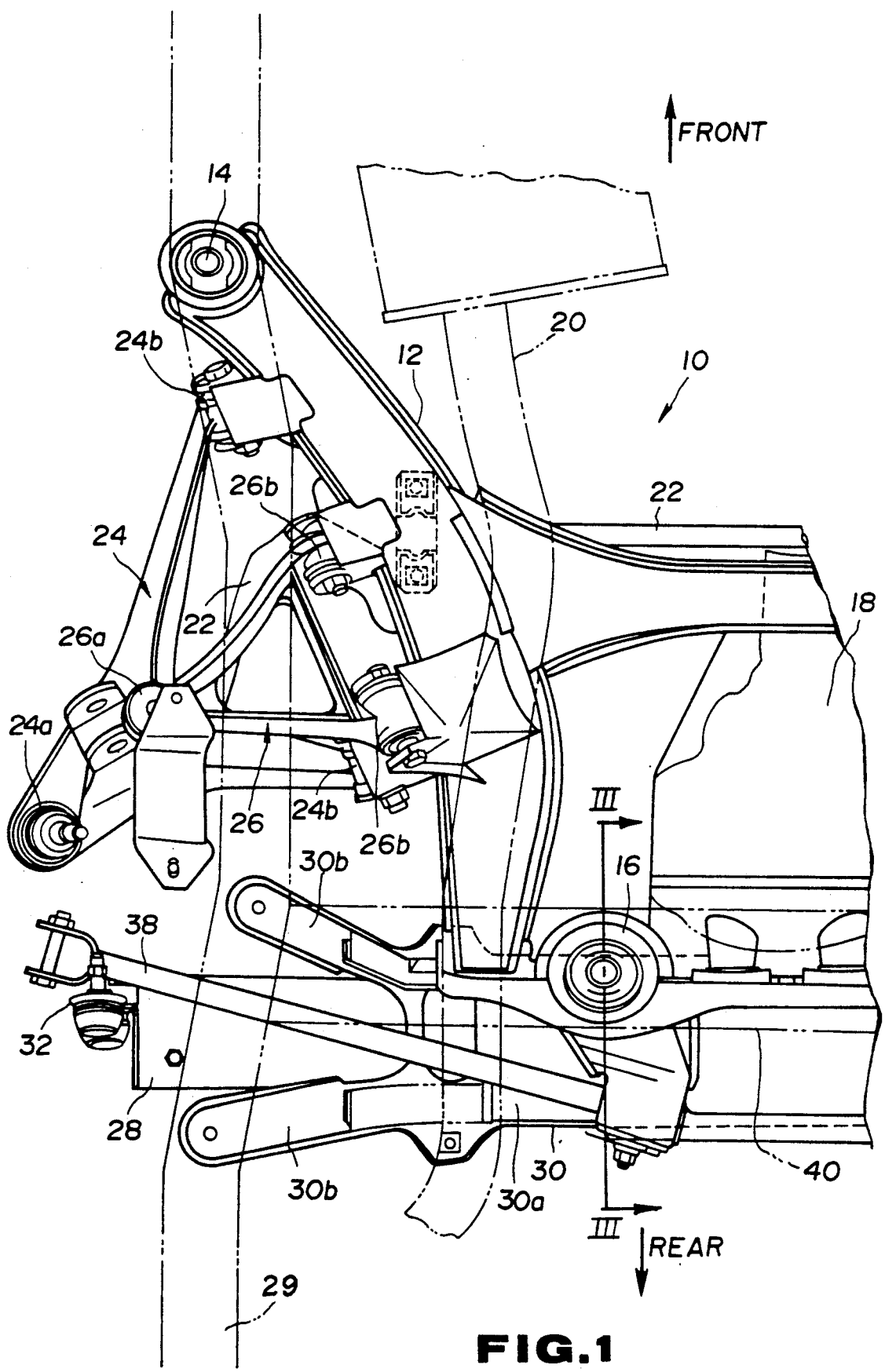
FIG. 1 is a plan view of a left half portion of a suspension unit of the present invention.
Figure 2:
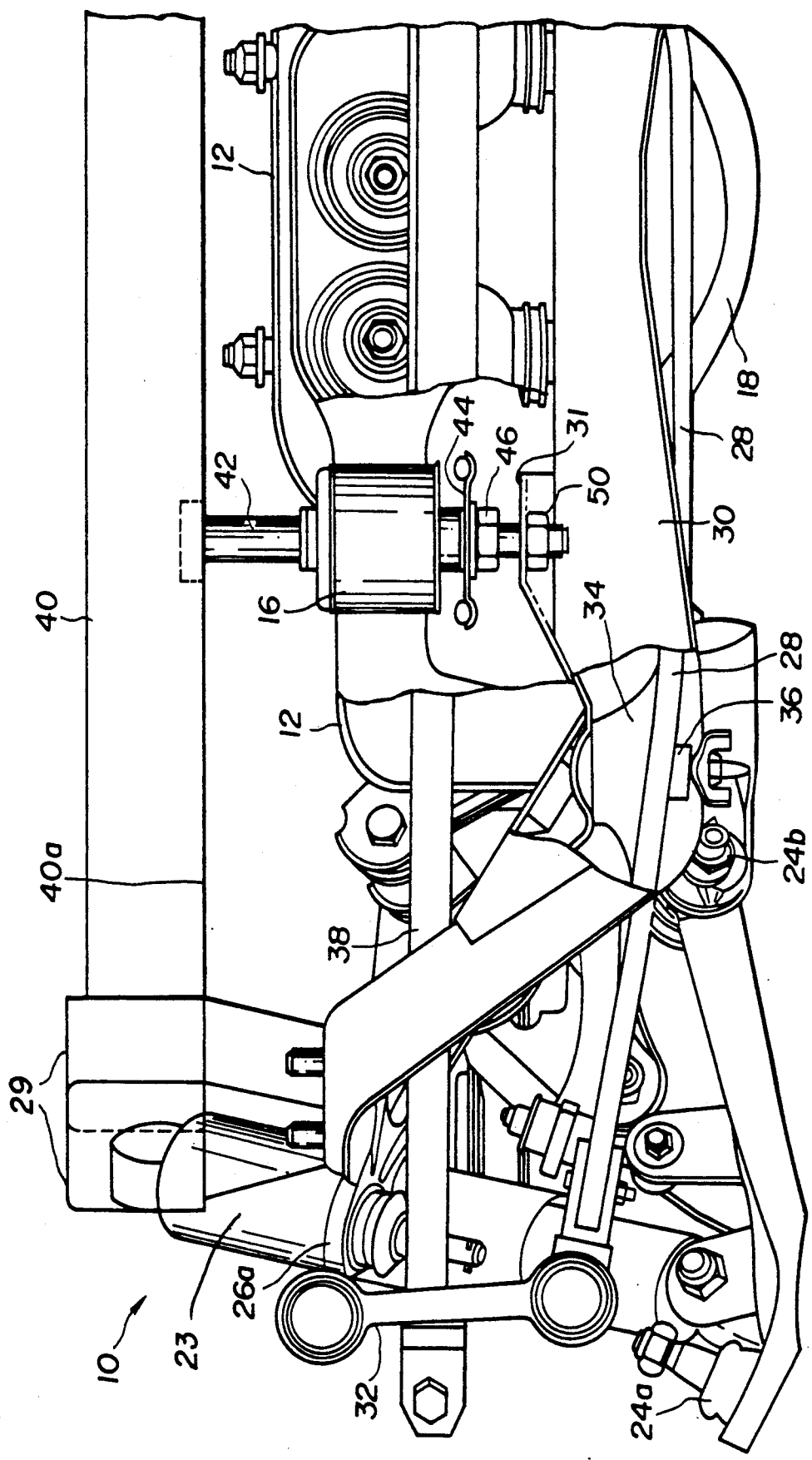
FIG. 2 is a rear elevational view of the left half portion of the suspension unit, showing a condition in which the suspension unit is mounted on a cross member of a vehicle body through a rear suspension-supporting bolt.
Figure 3:
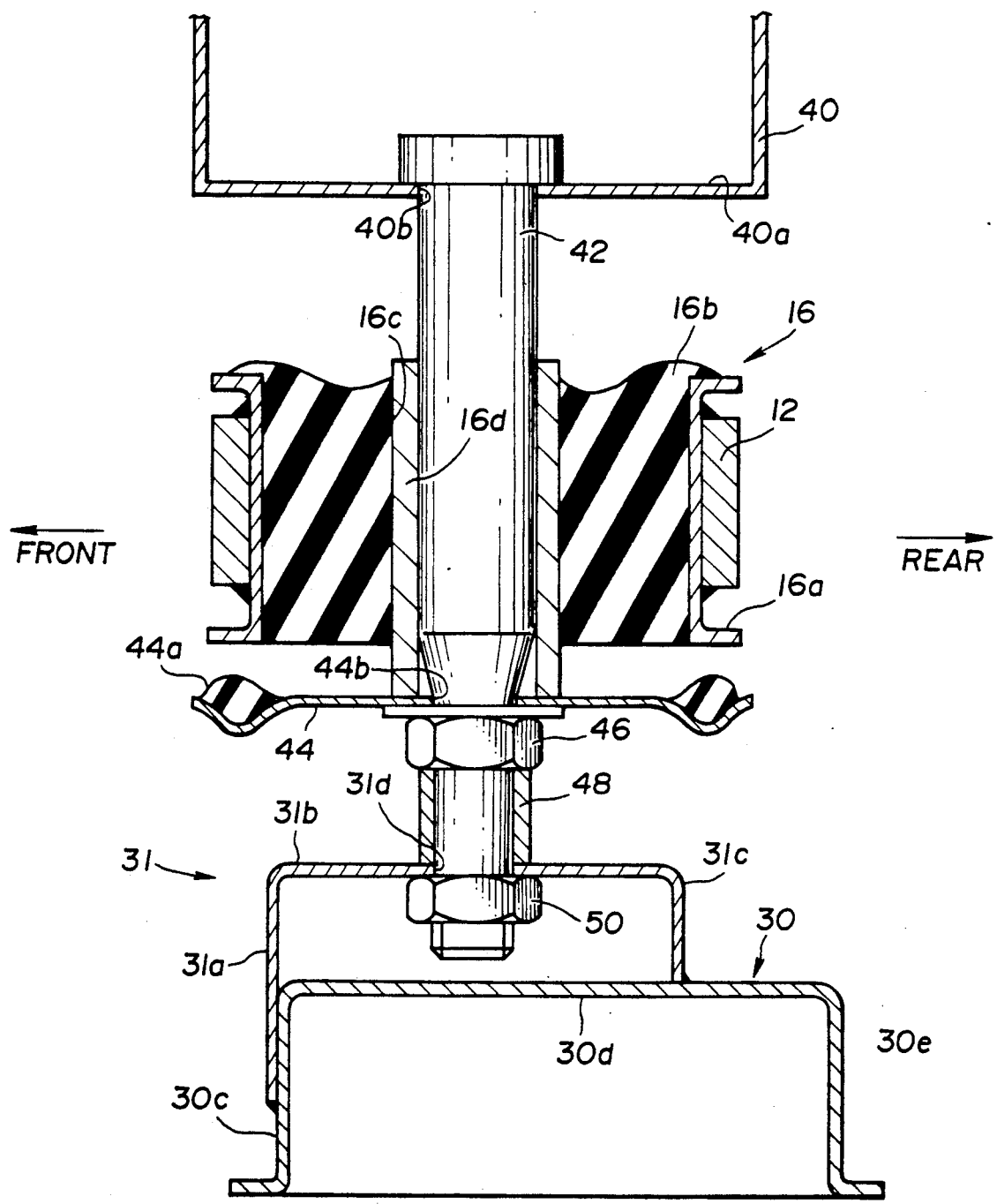
FIG. 3 is an enlarged sectional view taken along the line III—III of FIG. 1.

FIGS. 1 to 3 show an embodiment of the present invention.

The structure of a rear suspension unit 10 of the present invention is substantially similar to that of the aforementioned conventional rear suspension unit.

As is seen from FIGS. 1 and 2, a suspension member 12 of the rear suspension unit 10 has at its front side end portions two front suspension-mounting insulators 14 (only one is shown) and at its rear end portion two rear suspension-mounting insulators 16 (only one is shown). As will be clarified as the description proceeds, the rear suspension unit 10 is mounted at its front and rear suspension-mounting insulators 14 and 16 on a vehicle body.

Designated by numerals 18, 20, 22 and 23 are a differential casing, an exhaust pipe, a stabilizer bar and shock absorbers (only one is shown), respectively.

The rear suspension unit 10 has at its side portions two lower arms 24 (only one is shown) and two upper arms 26 (only one is shown) which are of the so-called A-shaped frame type. Each arm 24 or 26 is swingably connected at an outer end portion 24a or 26a thereof to an axle housing (not shown) and vertically swingably and elastically connected at inner end portions 24b or 26b thereof to the suspension member 12.

The front suspension-mounting insulators 14, the rear suspension-mounting insulators 16, the lower arms 24 and the upper arms 26 are respectively laterally symmetrical with respect to a longitudinal axis (not shown) of a vehicle.

The rear suspension unit 10 has at its rear end portion a transverse leaf spring 28 of a one-piece spring design. The leaf spring 28 is connected at its both ends to the axle housings through connecting links 32 (only one is shown). The leaf spring 28 is made of a material such as plastic or the like, which is so flexible as to absorb road shock.

A spring support member 30 for supporting the leaf spring 28 has a major middle portion 30a which is horizontally and transversely extended along the leaf spring 28 and two longitudinally opposed end portions (only one is shown). Each opposed end portion is bifurcated into two portions 30b which are upwardly extended and secured to a side member 29 of the vehicle body.

As is seen from FIG. 3, the major middle portion 30a of the spring support member 30 comprises a front vertical wall portion 30c, an upper horizontal wall portion 30d and a rear vertical wall portion 30e which are united.

As is seen from FIG. 2, the spring support member 30 partially receives the leaf spring 28 therein in such a manner that the leaf spring 28 is positioned between the front and rear vertical wall portions 30c and 30e of the spring support member 30. The spring support member 30 has at longitudinally opposed end portions of the major middle portion 30a thereof two pairs of upper and lower rubber members 34 and 36 (only one pair is shown) secured thereto. The leaf spring 28 is elastically supported by the spring support member 30 in such a manner that the leaf spring 28 is interposed and tightly held between the upper and lower rubber members 34 and 36.

As is seen from FIGS. 1 and 2, a lateral rod 38 is swingably connected at its outer end to the axle housing and is vertically swingably and elastically connected at its inner end to the rear end portion of the suspension member 12. If desired, the inner end of the lateral rod 38 may be connected to the spring support member 30.

Two front suspension-supporting bolts (not shown) extend downwardly from the vehicle body and are secured to the front suspension-mounting insulators 14 in a conventional manner to achieve a tight connection of the suspension unit relative to the vehicle body.

Referring FIGS. 2 and 3, a cross member 40 of the vehicle body has at its horizontal wall portion 40a two spaced through holes 40b (only one is shown) for receiving two rear suspension-supporting bolts 42 (only one is shown).

Each rear suspension-mounting insulator 16 comprises an outer hollow cylindrical portion 16a, an elastic member 16b which is received in the outer hollow cylindrical portion 16a and has at its center a through bore 16c, and an inner hollow cylindrical portion 16d which is received in the through bore 16c. The inner hollow cylindrical portion 16d is vertically in alignment with the through hole 40b of the cross member.

Designated by numerals 44 are circular washers (only one is shown), each of which has at a periphery of an upper surface thereof a ringlike elastic member 44a and at its center a through hole 44b for receiving the rear suspension-supporting bolt 42.

The spring support member 30 has two spaced bolt-fixing portions 31 (only one is shown), each of which comprises a front vertical wall portion 31a, an upper horizontal wall portion 31b and a rear vertical wall portion 31c and is welded to the spring support member 30 (see FIG. 3). Each bolt-fixing portion 31 is positioned directly below the rear suspension-mounting insulator 16 and has a through hole 31d for receiving the rear suspension-supporting bolt 42 therein. The through hole 31d is vertically in alignment with the inner hollow cylindrical portion 16d of the rear suspension-supporting insulator 16 and the through hole 40b of the cross member 40.

Each rear suspension-supporting bolt 42 is secured at its upper end portion to the cross member 40 and downwardly extends from the same. The rear suspension supporting bolt 42 passes through the inner hollow cylindrical portion 16d of the rear suspension-mounting insulator 16 and the through hole 44b of the washer 44, and threadedly engages with a nut 46 so as to elastically mount the suspension member 12 on the vehicle body. Furthermore, each rear suspension-supporting bolt 42 passes through a collar 48 and the through hole 31d of the bolt fixing portion 31, and threadedly engages with a nut 50. With this, unlike the above-mentioned conventional suspension unit, each rear suspension-supporting bolt 42 is secured to the spring support member 30. The collar 48 is so sized as to be tightly held between the nut 46 and the upper horizontal wall portion 31b of the bolt fixing portion 31 so as to prevent looseness of the nut 46.

Advantages of the structure for mounting the rear suspension unit 10 on the vehicle body of the present invention will be described in the following.

Since each rear suspension-supporting bolt 42 is secured at its upper end portion to the cross member 40, at its middle portion to the suspension member 12, and at its lower end portion to the spring support member 30, the rigidity with which the structure supports each rear suspension-supporting bolt 42 is substantially enhanced. Thus, the vibration of the rear suspension unit 10 and noise caused by the vibration are substantially suppressed.

Since the spring support member 30 is connected to the cross member 40 through the rear suspension-supporting bolts 42, rigidity with which the structure supports the spring support member 30 is also enhanced. Therefore, reinforcement for the suspension unit can be reduced, thereby lowering the weight of the rear suspension unit 10.

Although the above-mentioned preferred embodiment was described with respect to the rear suspension unit 10, the present invention may be applicable to a front suspension unit, too.

What is claimed is:

1. A structure of a vehicle, comprising:
a cross member which constitutes a part of a vehicle body;
a suspension unit which has a supported portion and a transverse leaf spring;
a spring support member secured to the vehicle body, said spring support member being positioned below said cross member; and
a suspension supporting bolt which has an upper end portion secured to said cross member, a lower end portion secured to said spring support member, and a middle portion secured to the supported portion of said suspension unit.

2. A structure as claimed in claim 1, in which said spring support member is secured at longitudinally opposed end portions thereof to side members of the vehicle body, said side members being secured to side portions of the vehicle body.

3. A structure as claimed in claim 2, in which each of the longitudinally opposed end portions of said spring support member is bifurcated into two portions extending upwardly from a major portion thereof, an outer end of each of the portions being secured to the side member.

4. A structure as claimed in claim 1, in which the supported portion comprises an insulator having an elastic member and a through bore, and in which said suspension supporting bolt generally vertically passes through the through bore and is threadedly engaged with a first nut, the insulator being positioned directly below said cross member.

5. A structure as claimed in claim 4, in which said spring support member comprises a major portion and the longitudinally opposed end portions, the major portion comprising a first upper horizontal wall portion and first opposed vertical wall portions extending from the first upper horizontal wall portion, said spring support member having a bolt fixing portion for fixing said suspension supporting bolt thereto, the bolt fixing portion being mounted on said spring support member, the bolt fixing portion being positioned directly below the insulator and said cross member, the bolt fixing portion comprising a second upper horizontal wall portion and second opposed vertical wall portions extending from the second upper horizontal wall portion, the second upper horizontal wall portion being positioned above the first upper horizontal wall portion, the second upper horizontal wall portion having a through hole formed therein for receiving said suspension supporting bolt, the through hole being vertically in alignment with the through bore of said insulator.

6. A structure as claimed in claim 5, in which said suspension supporting bolt passes through the through hole of the bolt fixing portion and threadedly engages with a second nut so as to fix said suspension supporting bolt to said spring support member, a lower end of said suspension supporting bolt being positioned above the first upper horizontal wall portion of said spring support member.

7. A structure as claimed in claim 6, in which a collar is interposed and tightly held between the first nut and the second upper horizontal wall portion so as to prevent looseness of the first nut.

8. A structure as claimed in claim 4, in which a circular washer is interposed between the insulator and the first nut and has at a periphery of an upper surface thereof a ringlike elastic member.

9. A vehicle suspension unit mounted on a vehicle body through a suspension supporting bolt, said vehicle suspension unit comprising:
   a suspension member which has a supported portion;
   an upper arm in the form of an A-shaped frame, said upper arm being swingably connected at inner end portions thereof to said suspension member;
   a lower arm in the form of an A-shaped frame, said lower arm being swingably connected at inner end portions thereof to said suspension member; and
   a transverse leaf spring connected to said suspension member through a connecting link, said transverse leaf spring being supported by a spring support member which is secured to and positioned below the vehicle body,
   wherein the suspension supporting bolt has an upper end portion secured to the vehicle body, a lower end portion secured to the spring support member, and a middle portion secured to the supported portion of the suspension member.

* * * * *